United States Patent [19]

Queneau et al.

[11] Patent Number: 5,466,278
[45] Date of Patent: Nov. 14, 1995

[54] PROCESS FOR THE MANUFACTURE OF STEEL

[75] Inventors: Paul E. Queneau, Cornish, N.H.; Martin Hirsch, Friedrichsdorf, Germany

[73] Assignee: Metallgesellschaft Aktiengesellschaft, Frankfurt am Main, Germany

[21] Appl. No.: 223,833

[22] Filed: Apr. 6, 1994

Related U.S. Application Data

[63] Continuation of Ser. No. 77,757, Jun. 15, 1993, abandoned, which is a continuation of Ser. No. 625,857, Dec. 11, 1990, abandoned.

[51] Int. Cl.$^6$ .................................................. C21B 13/14
[52] U.S. Cl. .................................. 75/501; 75/502; 75/957
[58] Field of Search ............................ 75/500, 501, 502, 75/957

[56] References Cited

U.S. PATENT DOCUMENTS

| | | | |
|---|---|---|---|
| 3,326,671 | 6/1967 | Worner | 75/500 |
| 4,540,432 | 9/1985 | Hirsch et al. | 75/532 |

FOREIGN PATENT DOCUMENTS

| | | | |
|---|---|---|---|
| 0237811 | 2/1987 | European Pat. Off. | |
| 1046675 | 10/1966 | United Kingdom | 75/501 |

OTHER PUBLICATIONS

"Oxygen Technology and Conservation" Metallurgical Transactions B, vol. 8B, pp. 358–368 (Sep. 1977).
"Direct Steelmaking Project to Benefit American Industry", 33 Metal Producing, pp. 23 and 26, (Jun. 1988).
"The Irside Continuous Steelmaking Process", A. Berthet et al, Journal of the Iron and Steel Institute, pp. 790–797 (Jun. 1969).
"Smelting Reduction in Iron Baths", Karl Brotzmann, Steel Research 60, No. 3+4, pp. 110–112 (1989).
"Conclusions of the Development of Smelting Reduction", Fine et al, Steel Research 60 No. 3+4, pp. 188–190, (1989).
"Oxygen Steelmaking: Its Control and Future", H. W. Meyer, Journal of the Iron and Steel Institute, pp. 781–789 (Jun. 1969).
"Oxygen Steelmaking in the Future", R. D. Pehlke, Prepared for the International Sumposium for the Year 2000 and Beyond, AIME annual meeting Feb., 1989, Las Vegas, Nev., pp. 603–611.
"Innovation and the Future of the American Primary Metals Industry" Paul E. Queneau, Journal of Metals, vol. 37, No. 2, pp. 59–64, (Feb. 1985).
"Direct Reduction and Smelting Reduction—an Overview", Rolf Steffen, Steel Research 60 No. 3+4, pp. 96–103 (1989).
"The QSL Reactor for Lead and Its Prospects for Cu, Ni and Fe", Paul E. Queneau, Journal of the Minerals, Metals and Material Society, vol. 41, No. 12, pp. 30–35, Dec. 1989.
"Continuous Steelmaking", M. W. Thring, Steel & Metals International, Jul. 1970, pp. 15–28.
"A New Iron Ore Recovery Process", W. A. Mudge, Metal Progress, pp. 108–111 (Mar. 1962).

*Primary Examiner*—Melvyn J. Andrews
*Attorney, Agent, or Firm*—Felfe & Lynch

[57] ABSTRACT

The invention describes a process for the manufacture of steel with a carbon content of <0.8 wt.-% by reducing iron ore and refining the hot metal. Iron ore and fuel are introduced into the reduction zone of a reactor that contains an iron melt in the reduction zone. This melt is covered by a liquid slag layer from which liquid slag is withdrawn. Further, oxygen-containing gas together with fuel is blown into the iron melt contained in the reduction zone. The iron melt extends into the refining zone of the reactor, the slag layer flows from the refining zone into the reduction zone and in the refining zone liquid steel is withdrawn. Oxygen-containing gas is supplied to the iron melt contained in the refining zone and liquid iron is withdrawn therefrom.

32 Claims, 1 Drawing Sheet

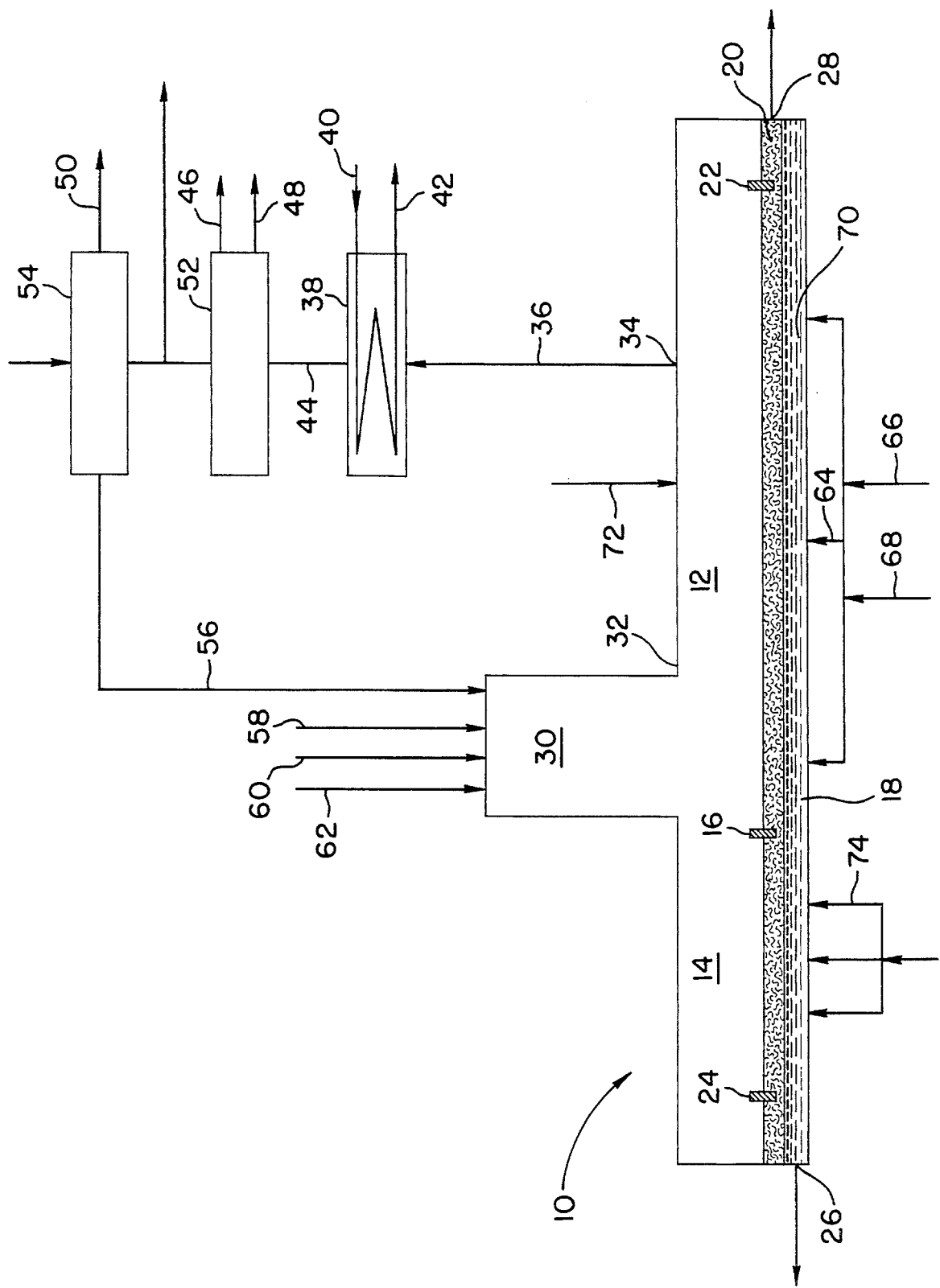

5,466,278

PROCESS FOR THE MANUFACTURE OF STEEL

This application is a continuation of application Ser. No. 08/077,757, filed Jun. 15, 1993, now abandoned, which is a continuation of Ser. No. 07/625,857, filed Dec. 11, 1990, now abandoned.

BACKGROUND OF THE INVENTION

The present invention is in a process for manufacturing steel with a carbon content of less than 1 wt.-%, preferably less than 0.8 wt.-%, and most preferably less than 0.5 wt.-%, by reducing iron ore and refining the hot metal. Further, the invention also relates to an apparatus useful for practicing the process.

Iron with a carbon content of about 1 wt.-% is produced in a molten state and is referred to as steel. Today, steel is manufactured from raw or pig iron, sponge iron and scrap iron. In the manufacture of steel, the starting material, such as liquid pig iron is converted into steel by means of refining wherein the carbon contained in the liquid pig iron is oxidized by oxygen. At the same time, elements such as silicon, manganese, and phosphorous are at least partially removed from the liquid iron in an oxidized state which is contained in a slag. Subsequent to the refining, the steel can be further treated, if necessary, and withdrawn in a continuous or discontinuous manner. Whereas liquid pig iron is produced in a blast furnace, sponge iron is produced by solid state direct reduction of iron ore.

It is necessary to modify known manufacturing processes such that the efficiency of energy, iron ore and coal utilization is increased. Further, the use of scrap material should also be possible, and the generation of environmentally harmful waste products should be decreased.

EP-OS 237 811 discloses a process which permits the prereduction of iron ore even when low-grade coal is used. The process of EP-OS 237 811 accomplishes this object by providing for a two-stage melting reduction of iron ore, using fuel and an oxidizing gas. Iron ore is prereduced in a melting cyclone to essentially wuestite. In a subsequent iron bath reactor, liquid pig iron is produced.

The disclosure of U.S. Pat. No. 4,540,432 states as an object to provide a process for the continuous melting of sponge iron having a large particle size range, using solid carbonaceous fuel. The patent describes a process for this purpose, wherein melting of the sponge iron is carried out in an elongated, approximately horizontal reactor. In that process, sponge iron is charged into the center area of the reactor, carbonaceous fuel and oxygen-containing gases are blown into the melt and liquid slag and iron are withdrawn on opposite sides of the reactor. In order to economically melt sponge iron with a large particle size range using solid fuel, the sponge iron is charged into the center area comprising 20 to 40% of the total length of the reactor.

It is the object of the present invention to provide a process for the manufacture of steel which permits reduction of iron ore and the refining of the pig iron so produced to steel in a single reactor. The efficiency of energy use is optimized in this process with iron ore being used as a raw material.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE INVENTION

The drawing generally shows a process and apparatus of the invention.

THE INVENTION

The present invention is an energy efficient direct and continuous process for the production of steel having a carbon content of less than about 1.0 wt.-%, preferably less than 0.8 wt.-% and most preferably less than 0.5 wt.-%. The present invention is also in an apparatus including a single, approximately horizontally disposed, tilting reactor having a round cross section for carrying out the process.

The reactor has two zones, a reduction zone and a refining zone. In the process of the invention, iron ore and solid carbonaceous fuel are introduced into the reduction zone of the approximately horizontally disposed reactor. An iron melt of hot metal covered by a liquid slag layer is formed in the reduction zone and the liquid slag is withdrawn therefrom. An oxygen-rich gas and solid carbonaceous fuel are supplied to the iron melt contained in the reduction zone and an oxygen-rich gas is blown onto the slag layer. The iron melt passes or flows into the refining zone of the reactor, and the slag layer flows from the refining zone into the reduction zone. While the iron melt is in the refining zone an oxygen-rich gas is supplied to the melt in the refining zone. Liquid steel is withdrawn from the refining zone and gaseous reaction products formed in the reduction and the refining zones are exhausted from the reduction zone as exhaust gases.

The use of iron ore as a raw feed requires that a major reduction operation must be carried out. However, a greater part of the necessary reduction is accomplished in the slag layer. Oxygen-rich gas and fuel are fed to the slag layer from both the top and the bottom. The liquid slag is removed from the end of the reduction zone so that the slag formed in this zone does not flow into the refining zone. Accordingly, the material from the reduction zone does not interfere with the refining process. The blowing of oxygen rich gases onto the slag layer in accordance with the invention generates a large amount of energy. When blowing, the gas stream must not penetrate through the slag layer but should only indent it slightly. Any contact between already reduced liquid iron and the gas stream is thus avoided. The slag formed in the refining zone flows into the reduction zone. The steel flows in the opposite direction for removal from the refining zone. An advantage of the process of the invention is that steel can be produced from iron ore inside one single reactor and that only one single stream of exhaust gas needs to be treated.

In a further embodiment of the invention, a suspended shallow baffle is immersed in the slag layer at least between the reduction and the refining zones. The baffle allows fluid communication between the slag layer in the reduction and oxidation zones only below the baffle's lower edge. Thus, any turbulences created by blowing into the baths of the reduction zone and the refining zone do not impair the reactions in the two zones by cross-mixing their liquid phases. It is recommended that a similar baffle be provided in each of the two end zones of the reactor. Such an arrangement creates quiescent zones for the baths at the withdrawal points improving separation of the liquid metal and slag phases.

Coal or coke can be used as a solid carbonaceous fuel but coal is highly preferred. Coal with a high percentage of volatile compounds can be employed.

The process of the invention can also be conducted by partially replacing the iron ore by prereduced sponge iron, the preferred amount of sponge iron ranging from 20 to 50 wt.-%. According to the invention, it is also possible to introduce scrap metal preheated by the reactor exhaust gas into the reduction zone of the reactor.

It is particularly advantageous to use at least a part of the exhaust gas of the reactor for the prereduction of the iron ore. $CO_2$ and $H_2O$ are at least partially separated from the exhaust gas intended for the reduction. This method reduces the amount of reduction which must be accomplished in the slag layer of the reduction zone. In yet another embodiment of the invention, the exhaust gas is at least partially reintroduced into the reduction zone. $CO_2$ and $H_2O$ are at least partially separated from the exhaust gas prior to its reintroduction. The combustible components contained in the exhaust gas, such as CO and $H_2$, are thus optimally used for reduction.

In an advantageous embodiment of the invention the reduction zone is operated at a temperature between 1250 and 1450° C. and the refining zone is operated at a temperature between 1500 and 1650° C. Further, the iron ore and the solid fuel have a mean particle size of less than 0.1 up to 2 mm. The use of iron ore of a relatively fine particle size and fuel allows more rapid and uniform reduction and optimal heat transfer.

In another embodiment of the invention the fine-grain iron ore with a grain size of <0.1 mm is agglomerated prior to introduction into the reduction zone. The dust separated from the exhaust gas of the reactor is mixed with the iron ore of a fine particle size, then agglomerated and introduced into the reduction zone. This mode of operation permits an advantageous recycling of waste products and the use of fine-particle size raw materials. It is also advantageous in accordance with the invention to supply iron ore as a coolant to the refining zone which allows for temperature control. In addition to the iron ore, the slag forming agents introduced in the refining zone also serve as coolants.

In still another embodiment of the invention, hot gases are produced at the beginning of the reduction zone in a vertical shaft above the reactor by combustion of recycled CO and $H_2$ and partial combustion of solid carbon containing fuel with oxygen. Iron ore is then introduced into the downwardly flowing gases, suspended in the gases, heated up while in suspension, and prereduced to wuestite. After leaving the shaft, it drops onto the slag below. The beginning of the reduction zone is immediately contiguous to the refining zone and continuous directly therefrom. The shaft is immediately above a corresponding opening in the roof of the reactor. It is also possible to supply reintroduced exhaust gas into the shaft, after separation of $CO_2$ and $H_2O$, thus replacing a corresponding amount of solid carbonaceous reducing agent. The iron ore can thus be prereduced in a particularly advantageous manner.

Further, the object underlying the invention is obtained by providing an apparatus for the working of the process of the invention. This apparatus comprises a single tiltable reactor which is approximately horizontally disposed and has a round cross section. The reactor preferably has a preheating/prereduction zone, a smelting reduction zone and a refining oxidation zone. The reduction zone has devices for the supply of iron ore and solid fuel as well as for supply of bottom and top-blown oxygen-rich gas and solid fuel. Further, the reduction zone is equipped with devices for withdrawing exhaust gas and slag, and the refining zone also has devices for supply of bottom and top-blown oxygen-rich gases and withdrawing liquid steel. The preheating/prereduction zone is located closer to the steel outlet of the reactor than it is to the slag discharge portion. Preferably, the length of the reduction zone is substantially greater than that of the refining zone.

The invention permits a continuous and direct production of steel from iron rich materials with high efficiency and ensures high operating reliability while providing a great degree of flexibility for the treatment of iron ore and scrap using solid fuel of different compositions.

In accordance with another embodiment of the apparatus of the invention, the reactor is equipped with a suspended shallow baffle separating the reduction and refining zones. The baffle is so positioned and dimensioned that it separates only in the upper portion of the slag layer.

In another embodiment of the invention, the apparatus includes cooling means, such as a boiler tube array, which may be suspended from the reactor roof, to cool the part of the reactor that forms the reduction zone. Further, the reduction zone has at least one lance to blow an oxygen-containing gas onto the slag layer for oxidation of solid fuel remaining in the slag and for post combustion of coal volatiles. These measures permit an optimal temperature control in the reduction zone.

Referring to the drawing, a tiltable reactor 10, having a round cross-section, is essentially horizontally disposed. The reactor 10 advantageously has a reduction zone 12 and a refining or oxidation zone 14, the respective zones 12 and 14 being essentially contiguous. The reactor 10 has at least one baffle 16 which will be more fully described below. Baffle 16 is positioned so as to separate zones 12 and 14.

As generally indicated in the drawing, there is a liquid metal layer 18 covered by a liquid slag layer 20 containing impurities. Each of the reduction zone 12 and refining zone 14 optionally may be equipped with baffles 22 and 24 respectively.

Reactor 10 is formed with devices, such as discharge ports 26 and 28 for the discharge of steel and slag respectively.

In a preferred embodiment, reactor 10 also has a preheating/prereduction zone 30 in the form of a shaft leading into the reactor through an opening in the uppermost surface or roof 32 of the reactor 10. An exhaust duct 34 enables removal of exhaust gases 36 from reactor 10. The exhaust gas stream contains products of combustion, such as $CO_2$ and $H_2O$, along with combustible components CO and $H_2$ and possibly particulate matter.

As illustrated in the drawing, the exhaust gas can be passed through a steam generator or heat exchanger 38 wherein a feed stream, such as boiler feed water 40, is converted to steam 42. Such steam generating and/or thermal energy recovery devices are well known.

The gas stream 44 leaving heat exchanger 38 can be further processed for at least the partial removal of $H_2O$ 46 and particulate matter or dust 48 and $CO_2$ 50 in known conventional equipment 52 and 54.

The so treated gas 56, which is rich in combustible components, can then be reintroduced into the reactor 10. The reintroduction of the gas may be through shaft 30 as indicated in the drawing. When this embodiment is practiced, there can be a preheating and/or a prereduction of the ore in zone 30 by the introduction of oxygen 58 along with coal 60 and the ore with fluxing agents 62.

The reactor 10 has provisions such as ports or nozzles, so that devices such as an injector 64 for submerged introduction of oxygen 66 and fuel 68, such as coal, into the iron melt 70 is accomplished in reduction zone 12 of reactor 10. Also, the reactor has provisions so that an oxygen rich, e.g., commercial oxygen gas stream 72 can be blown into the reduction zone 12 onto the slag layer 20. The preheating/prereduction zone 30 is located closer to the steel outlet 26 than to the slag outlet 28. Preferably, the length of the reduction zone is substantially greater than that of the refining zone.

In that part of reactor 10 housing the refining zone 14, there are provisions for the introduction of other gas streams by known techniques and combinations thereof, e.g., a submerged injection. By such techniques a substantially nitrogen free oxygen containing gas 74 can be introduced onto or into the melt in the refining zone. This gas can be blown in from above to contact the metal or by a combination of from above and below and can be introduced into the refining zone 14 adjacent to the reduction zone 12 and/or near where the steel is withdrawn.

In the reactor 10, the iron melt in the reduction zone 12 flows into the refining zone 14 and the slag layer on top of the melt in the refining zone flows into the reduction zone. However, because of suspended shallow baffle 16, which is immersed in the slag layer, the slag can only pass from one zone to the other below the lower edge of the baffle. The iron melt is refined in the oxidation zone under the action of the nitrogen free oxygen and a steel, having a carbon content of less than 1 wt.-%, preferably less than 0.8 wt.-% and most preferably less than 0.5 wt.-%, is withdrawn from reactor 10. The withdrawn steel can be further treated by ladle refining.

The raw material, such as iron ore of stream 62 is advantageously a <0.1 mm concentrate and can be of a particle size of up to 2 mm (2000 microns). The solid fuel may have a particle size of 0.1 mm or less. Particles of a size of less than 0.1 mm may be agglomerated before introduction into the reactor 10 and especially prior to introduction into reduction zone 12. The smaller material can be mixed with dust removed from stream 48, then agglomerated and used in the process.

The iron ore can be introduced into the refining zone where it can function as a coolant to control temperature.

In a particularly advantageous embodiment of the invention, the solid carbonaceous containing fuel 60 is coal. Hot gases are produced in zone 30 above reactor 10 by partial combustion of the coal with oxygen containing gas 58 which is preferably oxygen. The iron ore of stream 62 is supplied in a finely divided form to the downwardly flowing gasses in zone 30. The iron ore becomes suspended in the gases, is preheated and prereduced in the suspension to wuestite-rich particles. After leaving the zone 30 the suspension drops onto the slag layer.

EXAMPLE

A tubular reactor with a round cross section and approximately 46 m in length is used for the working of the process. A baffle divides the reactor into a reduction and a refining zone. This baffle separates the reactor in such a way that the reduction zone occupies two thirds of the reactor length and the refining zone one third. At the beginning of the reduction zone there is a shaft of 6 m in diameter and 3 m in height. Per hour, the latter is fed with 92 metric tons of iron ore, 4.2 metric tons of carbon, 9,200 Nm$^3$ of oxygen, 37,000 Nm$^3$ of CO and 3,000 Nm$^3$ of H$_2$. CO and H$_2$ are recovered from the reactor exhaust gas. In the reduction zone, 9,000 Nm$^3$ O$_2$ are blown onto the slag layer from the top downward via at least one lance whereas 9,000 Nm$^3$ O$_2$ and 23 metric tons of carbon are blown from the bottom upward into the iron melt which is contained in the reduction zone. 15 metric tons of slag are withdrawn from the reduction zone per hour. 94,000 Nm$^3$ of exhaust gas are removed from the reduction zone per hour. This exhaust gas contains 42.7% CO, 42.7% CO$_2$, 3.5% H$_2$ and 11.1% H$_2$O and has a temperature of 1500° C. The exhaust gas is freed from dust, then cooled, and CO$_2$ is largely removed before the exhaust gas is reintroduced into the shaft.

The fuel introduced in the shaft is mixed with oxygen and partly burnt. 2,200 Nm$^3$ of O$_2$ per hour are blown from the bottom into the liquid hot metal in the refining zone. 60 metric tons of steel with a carbon content of 0.75% are withdrawn from the refining zone per hour. Slag forming agent and iron ore can be added to the hot metal in the refining zone.

It will be understood that the specification and examples are illustrative but not limitative of the present invention and that other embodiments within the spirit and scope of the invention will suggest themselves to those skilled in the art.

We claim:

1. A direct and continuous process for steel making with a carbon content of less than 1.0 wt.-% by reducing iron ore and refining the hot metal, comprising:

introducing iron ore and carbonaceous fuel into a reduction zone of an approximately horizontally disposed tiltable reactor having a round cross section;

forming an iron melt made of hot metal covered by a liquid layer of slag in the reduction zone;

injecting by a submerged injection an oxygen-rich gas and solid carbon-containing fuel into the iron melt in the reduction zone;

blowing an oxygen-rich gas onto the slag layer without penetrating the slag layer in the reduction zone;

passing the iron melt from the reduction zone into a refining oxidation zone of the reactor, the slag layer from the refining zone flows into the reduction zone;

withdrawing the liquid slag from the reduction zone;

supplying substantially nitrogen-free oxygen gas by submerged injection into the iron melt in the refining zone wherein liquid steel is formed;

withdrawing liquid steel from the refining oxidation zone; and removing gaseous reaction products formed in the reduction and refining zones from the reduction zone as an exhaust gas.

2. The process of claim 1 wherein said reactor contains a baffle having a lower edge and said baffle is immersed into the slag layer between the reduction and refining zones and allows passage of the slag layer in the reduction and oxidation zones only below the lower edge thereof.

3. The process of claim 1 wherein the solid carbon-containing fuel is coal.

4. The process of claim 1 wherein the iron ore is prereduced iron ore.

5. The process of claim 1 wherein that scrap iron and/or steel, preheated by the exhaust gas of the reactor, is introduced into the reduction zone of the reactor.

6. The process of claim 1 wherein the exhaust gas from the reactor contains CO$_2$ and H$_2$O, at least a portion of the CO$_2$ and H$_2$O are separated from the exhaust gas and at least a part of the exhaust gas is used for the prereduction of the iron ore.

7. The process of claim 1 wherein said exhaust gas contains $CO_2$ and $H_2$ at least a portion of the $CO_2$ and $H_2O$ are separated from the exhaust gas and the exhaust gas is at least partially reintroduced into the reduction zone.

8. The process of claim 1 wherein the reduction zone is at a temperature of from 1250° to 1450° C. and the refining zone is at a temperature of from 1500° to 1650° C.

9. The process of claim 1 wherein substantially all of the iron ore-containing material has a grain size below 0.1 mm.

10. The process of claim 1 wherein the iron ore is in the form of a concentrate and substantially all of the concentrate has a grain size below 0.1 mm.

11. The process of claim 1 wherein substantially all the iron ore has a grain size below 2 mm.

12. The process of claim 1 wherein substantially all the solid fuel is below 0.1 mm in size.

13. The process of claim 1 wherein the iron ore with a grain size of <0.1 mm is agglomerated prior to reaching the reduction zone.

14. The process of claim 1 wherein the reactor exhaust gas contains dust, and the dust is separated from the exhaust gas, agglomerated, and reintroduced into the reduction zone.

15. The process of claim 1 wherein the reactor exhaust gas contains a dust which dust is separated from the exhaust gas, mixed with the fine-grain iron ores, agglomerated and reintroduced into the reduction zone.

16. The process of claim 1 wherein iron ore is introduced into the refining zone.

17. The process of claim 3 wherein the reduction zone has a beginning section, hot gases are produced in a vertical shaft above the reactor by partial combustion of coal with oxygen-rich gas, finely divided iron ore is supplied to the downwardly flowing gases and suspended, the finely divided iron ore is preheated and prereduced in the suspension to wustite-rich particles and, after leaving the shaft, drops on the slag layer.

18. The process of claim 1 wherein the withdrawn steel is treated by ladle refining.

19. The process of claim 1 wherein the nitrogen-free oxygen gas is introduced in that part of the refining zone which is adjacent the reduction zone.

20. The process of claim 1 wherein the carbon content of the steel is less than 0.5 wt.-%.

21. A direct and continuous process for steel making with a carbon content of less than 1.0 wt.-% by reducing iron ore and refining the hot metal, comprising:

introducing iron ore and carbonaceous fuel into a reduction zone of an approximately horizontally disposed tiltable reactor having a round cross section;

forming an iron melt made of hot metal covered by a liquid layer of slag in the reduction zone;

injecting by a submerged injection an oxygen-rich gas and solid carbon-containing fuel into the iron melt in the reduction zone;

blowing an oxygen-rich gas onto the slag layer without penetrating the layer;

passing the iron melt from the reduction zone into a refining oxidation zone of the reactor, the slag layer from the refining zone flows into the reduction zone;

withdrawing the liquid slag from the reduction zone;

introducing substantially nitrogen-free oxygen gas into the iron melt in the refining zone wherein liquid steel is formed;

withdrawing liquid steel from the refining oxidation zone; and removing gaseous reaction products formed in the reduction and refining zones from the reduction zone as an exhaust gas.

22. The process of claim 21 wherein the nitrogen-free oxygen gas is supplied to the melt in the refining zone by being blown from above onto the melt.

23. The process of claim 21 wherein the nitrogen-free oxygen gas is supplied from below by submerged injection and from above by being blown into the melt.

24. The process of claim 23 wherein the nitrogen-free oxygen gas is introduced in that part of the refining zone which is adjacent the reduction zone.

25. The process of claim 22 wherein the nitrogen free gas is introduced in that part of the refining zone which is adjacent to the withdrawing of the liquid steel from the reactor.

26. The process of claim 21 wherein the oxygen rich gas is oxygen and the solid carbon containing fuel is coal.

27. The process of claim 22 wherein the gas blown from above penetrates into the iron melt.

28. The process of claim 23 wherein the gas blown from above penetrates into the iron melt.

29. The process of claim 21 wherein nitrogen-free oxygen gas is introduced into the refining zone by a) submerged injection adjacent to the reduction zone and b) being blown from above in that part of the refining zone which is adjacent to steel withdrawal.

30. The process of claim 21 wherein the nitrogen-free oxygen gas is introduced into the refining zone by a) submerged injection from below adjacent to the reduction zone and b) being blown from above onto the melt with penetration, and c) from above in that part of the refining zone which is adjacent to the withdrawing of the liquid steel from the reactor.

31. The process of claim 21 wherein the carbon content of the steel is less than 0.5 wt.-%.

32. A direct and continuous process for steel making with a carbon content of less than 1.0 wt.-%, by reducing iron ore and refining the hot metal, comprising:

introducing iron ore and carbonaceous fuel into a reduction zone of an approximately horizontally disposed, tiltable, elongated reactor having a round cross section;

forming in the reduction zone an iron melt made of hot metal covered by a liquid layer of slag;

injecting by a submerged injection an oxygen-rich gas and solid carbon-containing fuel into the iron melt in the reduction zone;

blowing an oxygen-rich gas onto the slag layer without penetrating the layer in the reduction zone;

passing the iron melt from the reduction zone into a refining oxidation zone of the reactor, the slag layer from the refining zone flows into the reduction zone;

withdrawing the liquid slag from the reduction zone;

supplying substantially nitrogen-free oxygen gas by submerged injection into the iron melt in the refining zone;

withdrawing liquid steel from the refining oxidation zone; and removing gaseous reaction products formed in the reduction and refining zones from the reduction zone as an exhaust gas.

\* \* \* \* \*